No. 658,169. Patented Sept. 18, 1900.
T. C. AVERY.
VENTILATOR.
(Application filed Apr. 3, 1900.)
(No Model.)
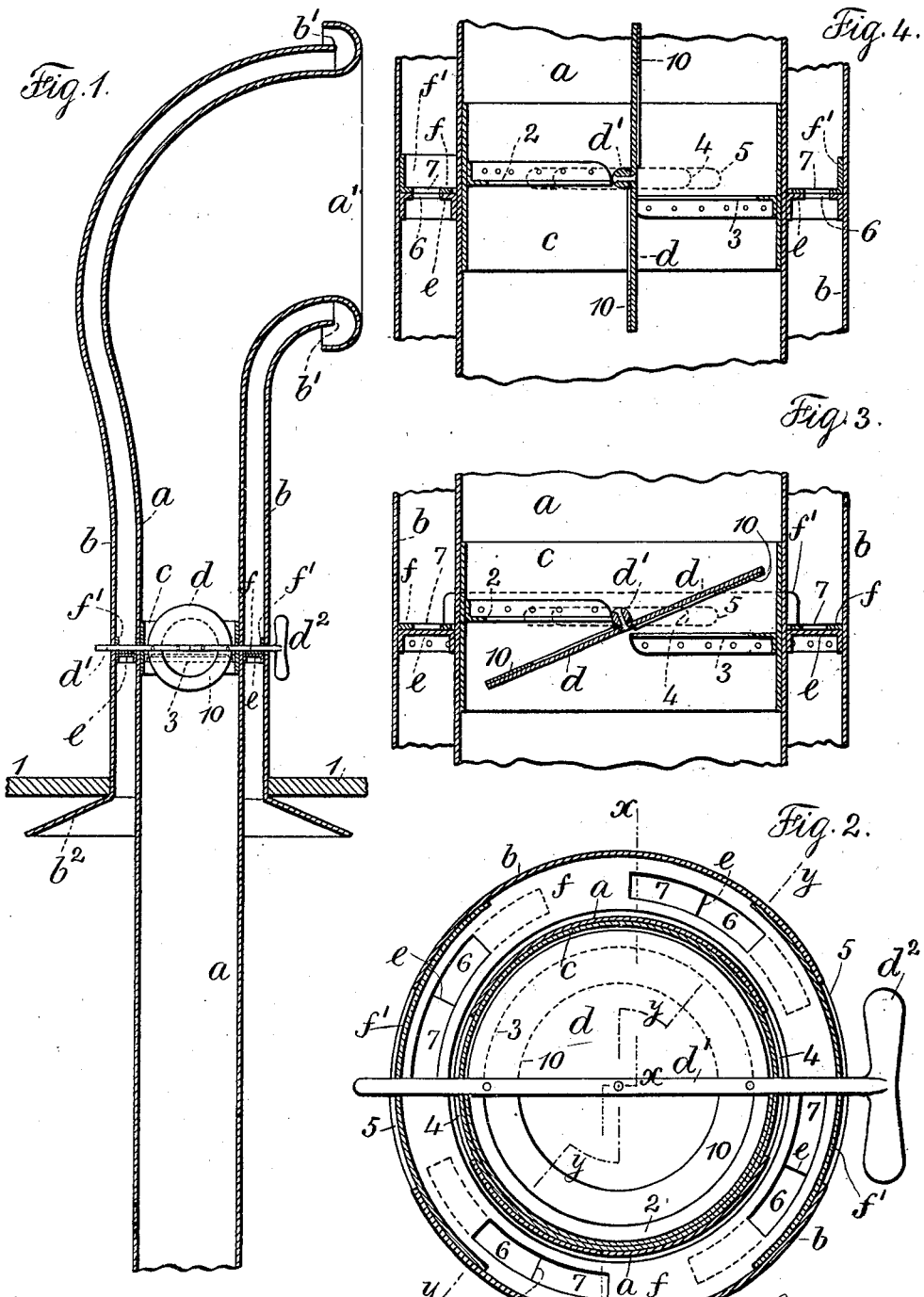

UNITED STATES PATENT OFFICE.

THOMAS C. AVERY, OF GARRISON'S, NEW YORK.

VENTILATOR.

SPECIFICATION forming part of Letters Patent No. 658,169, dated September 18, 1900.

Application filed April 3, 1900. Serial No. 11,304. (No model.)

*To all whom it may concern:*

Be it known that I, THOMAS C. AVERY, a citizen of the United States, residing at Garrison's, in the county of Putnam and State of New York, have invented an Improvement in Ventilators, of which the following is a specification.

My invention relates particularly to ventilating apparatus where there are two concentric pipes for currents of air passing in opposite directions, with the object in view of controlling either or both of these currents to the desired extent. These concentric pipes are employed especially on steamships, where there is a main and central downdraft produced by the forward movement of the vessel and a surrounding escape of the heated and spent air, and may be employed to bring fresh air into boiler-rooms, offices, and other apartments or places in tall buildings, factories, &c., from the roof. In carrying out my invention and in combination with these concentric pipes I employ a tube-section fitting and movable within the inner pipe and having flanges and a damper for closing the opening, the damper-rod being connected therewith and passing through the tube-section and through slots in the respective concentric pipes, and I also employ an annular flanged plate between the concentric pipes and fastened thereto and above the said plate another annular flanged and movable plate. In the two circular plates there are elongated curved openings that in one position register to provide a passage through the plates, which passage is closed by the plates in their other position. The damper-rod not only passes through openings in the tube-section and through the opposite slots in the concentric tubes and is connected to the damper, but the said rod passes through the flanges of the annular movable plate, so that by the movement of the damper-rod on its axis the damper is operated, and by the movement of the said rod in a horizontal plane the tube-section and the movable annular plate are simultaneously turned about the vertical axis of the concentric pipes, so as to open the communication between the concentric pipes or to close the same off. Provision is thus made for the incoming air to displace and force out the lighter heated air.

In the drawings, Figure 1 is a vertical section showing concentric pipes and the application of my improvement. Fig. 2 is a cross-section and plan through the concentric pipes and above the features of my improvement. Fig. 3 is a vertical section at $x\,x$ of Fig. 2, and Fig. 4 is a vertical section at $y\,y$ of Fig. 2, Figs. 2, 3, and 4 being shown of enlarged size for clearness.

The inside pipe $a$ of the ventilating device extends down to any desired place for the purpose of ventilation, and the same is provided with a funnel-mouth $a'$ and curved rim, and the outer pipe $b$ is concentric thereto and it terminates with an edge $b'$ behind the curved rim of the funnel-mouth, and the said pipes, as shown in Fig. 1, pass through the deck or platform 1, the pipe $b$ having a flange $b^2$ below the said platform and a tight joint being formed where the pipe $b$ passes through the platform. The tube-section $c$ fits within the pipe $a$ with sufficient freedom and looseness to be rotatable. The said tube-section is made with circular flanges 2 3, secured upon opposite sides and on parallel planes, and the damper $d$ fits within the tube-section $c$ and is connected to the rod $d'$, which rod passes through the tube-section $c$ and through slots 4 in the inner pipe $a$ and through slots 5 in the outer pipe $b$, the said slots being at opposite sides of the pipes, and the damper-rod $d'$ is provided at one end with a handle $d^2$, and the damper is preferably provided on opposite faces with segments 10, of rubber or similar material, adapted to come against the horizontal faces of the flanges 2 3, so as to close the passage in the inner pipe.

Between the concentric pipes $a\,b$ I place an annular flanged plate $e$, preferably fastened by rivets or solder to both pipes. This plate is provided with curved openings 6 of elongated form and spaced apart. Above the plate $e$ is a movable annular plate $f$, provided with flanges $f'$ at opposite sides, the said plate $f$ resting above the plate $e$ and coming directly below the damper-rod $d'$. This annular plate $f$ is provided with curved openings 7, spaced apart to register in one position on the said flanged plate with the openings 6 of the plate $e$, and the said openings 6 and 7 are of such length that in one position of the plate $f$ they coincide and in the other position of the plate $f$ the openings come intermediate to one another and the passageway is entirely closed off.

The damper-rod $d'$ is connected to the damper $d$, and the same passes through openings in the opposite sides of the tube-section $c$, through the horizontally-placed slots 4 5 in opposite sides of the inner pipe $a$ and outer pipe $b$, also through the flanges $f'$ of the annular plate $f$. The rotation of the damper-rod $d'$ by the handle $d^2$ swings the damper $d$ to open the passage through the inner pipe $a$. If the damper-rod $d'$ is grasped and moved in a horizontal plane from one end to the other of the slots 4 5, the tube-section $c$ and the damper will be moved within the inner pipe $a$, and the annular plate $f$ between the pipes $a$ and $b$ will be turned in its relation to the plate $e$ to either cause the openings 6 and 7 to coincide or to be closed off. In this way the draft through the annular passage between the pipes $a$ and $b$ may be maintained or closed and the downdraft through the inner pipe $a$ may be entirely or partially opened or entirely closed off. These conditions may be effected independent of one another, because, as hereinbefore stated, the rotation of the damper-rod simply operates the damper, while the movement in the horizontal plane of the damper-rod changes the relation of the plates $e$ and $f$, and between the two movements the desired position is effected and result obtained.

My improvements may be applied with equal advantage to funnel-mouth concentric ventilating-pipes adapted to rotate and which are maintained and turned with their openings to the wind or currents of air by a vane of any ordinary form.

My invention is equally applicable to buildings of various kinds, to vessels, and railroad-coaches, and vehicles.

I claim as my invention—

1. The combination in a ventilating apparatus, with concentric inner and outer pipes, of a damper-rod passing entirely and transversely through the said pipes, a damper connected to the said rod within the inner pipe, means for closing off the damper, annular perforated plates between the inner and outer pipes, the one fixed and the other connected to and movable by the damper-rod whereby the passage through the inner pipe or that between the pipes is opened or closed at pleasure, substantially as set forth.

2. The combination in a ventilating apparatus with inner and outer concentric pipes, of a tube-section within the inner pipe and adapted to turn therein, a damper-rod passing through openings in the opposite sides of the tube-section and through opposite slots in the inner and outer pipes, a damper connected to the said rod and flanges upon the inner face of the tube-section against which the damper closes, annular perforated plates between the inner and outer pipes, the one fixed and the other movable by the damper-rod in its relation to the fixed pipe whereby the passage-way through the inner pipe and that between the pipes may be wholly or partially closed or opened at pleasure, substantially as set forth.

3. In a ventilating apparatus, the combination with inner and outer concentric pipes, of a tube-section within the inner pipe having curved flanges in parallel planes, a damper-rod passing across through openings in the tube-section and through opposite slots in both of the concentric pipes, a damper connected to the damper-rod and provided with opposite yielding faces coming against the respective flanges, a perforated annular flanged plate between the concentric pipes and fixed thereto, an annular perforated plate between the concentric pipes and above the aforesaid annular plate and provided with opposite flanges through which passes the damper-rod whereby when the damper-rod is rotated, the damper is swung to open the passage in the inner pipe and when the damper-rod is swung in a horizontal plane the upper annular plate is moved in relation to the under fixed plate to cause their openings to coincide or be closed off, substantially as set forth.

Signed by me this 19th day of March, 1900.

THOMAS C. AVERY.

Witnesses:
 ALBERT G. JENKINS,
 LOUIS S. AVERY.